(12) United States Patent
Suh et al.

(10) Patent No.: US 11,360,897 B1
(45) Date of Patent: Jun. 14, 2022

(54) ADAPTIVE MEMORY ACCESS MANAGEMENT

(71) Applicant: QUALCOMM INCORPORATED, San Diego, CA (US)

(72) Inventors: Jungwon Suh, San Diego, CA (US); Pankaj Deshmukh, San Diego, CA (US); Michael Hawjing Lo, San Diego, CA (US); Shyamkumar Thoziyoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/231,867

(22) Filed: Apr. 15, 2021

(51) Int. Cl.
*G06F 12/0831* (2016.01)
*G06F 12/0864* (2016.01)
*G06F 13/40* (2006.01)
*G06F 13/16* (2006.01)
*G06F 12/02* (2006.01)

(52) U.S. Cl.
CPC ...... *G06F 12/0833* (2013.01); *G06F 12/0238* (2013.01); *G06F 12/0864* (2013.01); *G06F 13/1615* (2013.01); *G06F 13/1668* (2013.01); *G06F 13/409* (2013.01)

(58) Field of Classification Search
None
See application file for complete search history.

(56) References Cited

U.S. PATENT DOCUMENTS 6,658,531 B1 * 12/2003 Aleksic ............... G06F 12/0857
345/533

* cited by examiner

*Primary Examiner* — Charles J Choi
(74) *Attorney, Agent, or Firm* — Smith Tempel Blaha LLC/Qualcomm

(57) ABSTRACT

Dynamic random access memory (DRAM) data may be accessed by a memory controller using a broadcast mode or a non-broadcast mode. In the broadcast mode, a first portion of data that is the subject of an access request and a second portion of the data that is the subject of the access request may be accessed concurrently via first and second pseudo-channels, respectively. In the non-broadcast mode, data that is the subject of the access request may be accessed via a selected one of the first and second pseudo-channels.

30 Claims, 12 Drawing Sheets

FIG. 9

| | Broadcast Memory Access Scheme (Latency-Optimized Memory Accesses) | Non-Broadcast Memory Access Scheme (Bank Interleaving-Optimized Memory Accesses) |
|---|---|---|
| Effective Bank Org. | 16 banks (8 BGs) / Ch | 32 banks (16 BGs) / Ch |
| 32 Byte Latency | RL + 4nCK | RL + 4nCK |
| 64 Byte Latency | RL + 4nCK (RD16 with PCB=1) | RL + 12nCK |
| 128 Byte Latency | RL + 12nCK (RD32 with PCB=1) | RL + 16nCK (RD32 to RD32 (different BG)) -OR- RL + 28nCK (RD32 to RD32 (same BG)) |
| Examples of Clients | Latency-sensitive clients (e.g., modem, CPU, etc.) | Memory bandwidth-sensitive clients (e.g., GPU, NPU, etc.) |

ADAPTIVE MEMORY ACCESS MANAGEMENT

DESCRIPTION OF THE RELATED ART

A computing device may include multiple subsystems that communicate with one another via buses or other interconnects. Such a computing device may be, for example, a portable computing device ("PCD"), such as a laptop or palmtop computer, a cellular telephone or smartphone, portable digital assistant, portable game console, etc. Still another type of PCD may be used in automotive applications. The communicating subsystems may be included within the same integrated circuit chip or in different chips. A "system-on-a-chip" or "SoC" is an example of one such chip that integrates numerous components to provide system-level functionality. For example, an SoC may include one or more types of processors, such as central processing units ("CPU"s), graphics processing units ("GPU"s), digital signal processors ("DSP"s), and neural processing units ("NPU"s). An SoC may include other processing subsystems, such as a transceiver or "modem" subsystem that provides wireless connectivity, a memory subsystem, etc. The various processors may function as memory clients to initiate memory transactions with the memory subsystem. The main or system memory in PCDs and other computing devices commonly comprises dynamic random access memory ("DRAM").

As DRAM technology has evolved, storage arrays in successive DRAM generations have been organized in increasingly complex and flexible ways intended to provide increased performance over previous generations. For example, storage arrays have been organized in banks, and banks have been organized in bank groups, etc. Also, as memory bus widths have increased, the manner in which memory buses have been organized in channels has continued to evolve.

A memory controller architecture may attempt to leverage these more complex DRAM organizational features to improve performance for memory clients. Nevertheless, a computing device may have several memory clients (e.g., CPU, GPU, NPU, etc.), not all of which may benefit equally from a particular memory controller architecture.

SUMMARY OF THE DISCLOSURE

Systems, methods, computer-readable media, and other examples are disclosed for accessing data in a dynamic random access memory (DRAM). Data may be accessed by a memory controller selecting a broadcast mode or a non-broadcast mode.

An exemplary method for accessing data in a DRAM may include providing to the DRAM, by a memory controller, a command having a selectable pseudo-channel broadcast mode indication. The exemplary method may further include concurrently accessing, by the memory controller, a first portion of the requested data in the DRAM via a first pseudo-channel and a second portion of the requested data from the DRAM via a second pseudo-channel in response to the command when the state of the pseudo-channel broadcast mode indication indicates the broadcast mode. The exemplary method may still further include accessing, by the memory controller, the requested data in the DRAM via a selected one of the first and second pseudo-channels in response to the command when the state of the pseudo-channel broadcast mode indication indicates a non-broadcast mode.

An exemplary system for accessing data in a DRAM may include a memory controller and physical interface coupled to the memory controller and the DRAM. The memory controller may be configured to provide a command having a selectable pseudo-channel broadcast mode indication to the DRAM. The memory controller may further be configured to concurrently access a first portion of the requested data in the DRAM via a first pseudo-channel and a second portion of the requested data from the DRAM via a second pseudo-channel in response to the command when the state of the pseudo-channel broadcast mode indication indicates the broadcast mode. The memory controller may still further be configured to access the requested data in the DRAM via a selected one of the first and second pseudo-channels in response to the command when the state of the pseudo-channel broadcast mode indication indicates the non-broadcast mode.

Another exemplary system for accessing data in a DRAM may include means for providing a command having a selectable pseudo-channel broadcast mode indication to the DRAM. The exemplary system may further include means for concurrently accessing a first portion of the requested data in the DRAM via a first pseudo-channel and a second portion of the requested data from the DRAM via a second pseudo-channel in response to the command when the state of the pseudo-channel broadcast mode indication indicates the broadcast mode. The exemplary system may still further include means for accessing the requested data in the DRAM via a selected one of the first and second pseudo-channels in response to the command when the state of the pseudo-channel broadcast mode indication indicates the non-broadcast mode.

An exemplary DRAM may include a plurality of DRAM storage arrays and a DRAM command interface. The DRAM command interface may be configured to receive a command having a selectable pseudo-channel broadcast mode indication. The DRAM command interface may further be configured to concurrently access a first portion of the requested data in the DRAM storage arrays via a first pseudo-channel and a second portion of the requested data in the DRAM storage arrays via a second pseudo-channel in response to the command when the state of the pseudo-channel broadcast mode indication indicates the broadcast mode. The DRAM command interface may still further be configured to access the requested data in the DRAM storage arrays via a selected one of the first and second pseudo-channels in response to the command when the state of the pseudo-channel broadcast mode indication indicates the non-broadcast mode.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

FIG. 9 is a table illustrating aspects of selecting either a broadcast memory access scheme or a non-broadcast memory access scheme based on client type.

DETAILED DESCRIPTION

The word "exemplary" is used herein to mean "serving as an example, instance, or illustration." The word "illustrative" may be used herein synonymously with "exemplary." Any aspect described herein as "exemplary" is not necessarily to be construed as preferred or advantageous over other aspects.

Figure 1:
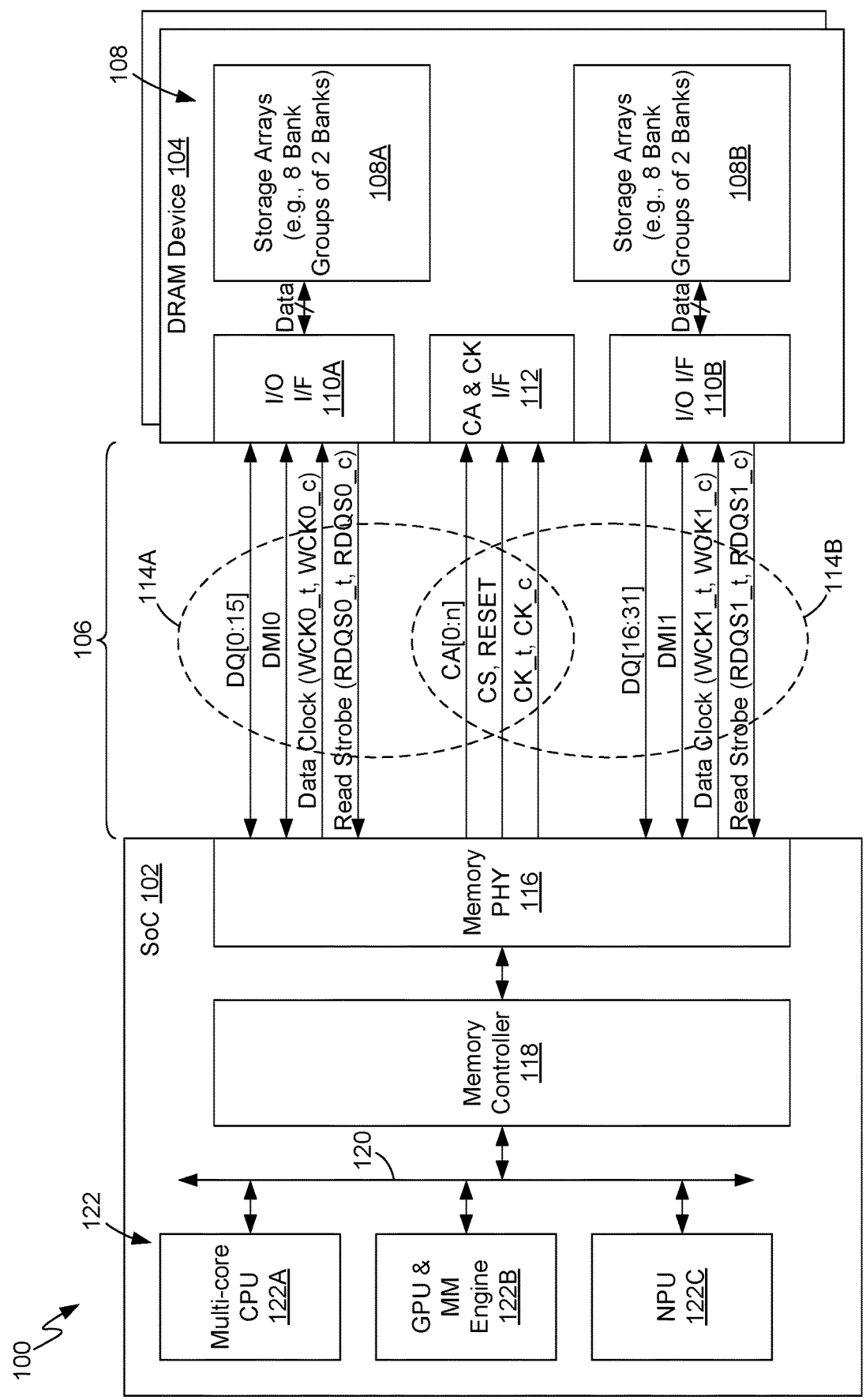
FIG. 1 is a block diagram illustrating a system for accessing data in a DRAM, in accordance with exemplary embodiments.

As illustrated in FIG. 1, a system 100 may include a system-on-a-chip ("SoC") 102 coupled to at least one dynamic random access memory ("DRAM") device 104 via a memory bus 106. Although not shown for purposes of clarity, the system 100 may be included in a computing device, which may be of any type.

The DRAM device 104 may double data-rate synchronous DRAM ("DDR-SDRAM"), sometimes referred to for brevity as "DDR." As DDR technology has evolved, DDR versions such as fourth generation low-power DDR ("LPDDR4") and fifth generation low-power DDR ("LPDDR5") have been developed.

The DRAM device 104 may include two storage array groups 108: a first storage array group 108A and a second storage array group 108B. Although not shown for purposes of clarity, each storage array group 108 may be organized in the form of eight bank groups ("BG"s), and each of the eight bank BGs may be organized in the form of two banks. Each storage array group 108 thus consists of 16 banks in the illustrated embodiment.

The first storage array group 108A may be coupled to a first input/output ("I/O") interface 110A of the DRAM device 104, and the second storage array group 108B may be coupled to a second I/O interface 110B of the DRAM device 104. The number of data lines coupling each storage array group 108 to its respective I/O interface 110A or 110B may be, for example, 256 bits.

In the illustrated embodiment, the memory bus 106 may be 32 bits wide (i.e., consisting of 32 data lines). In the illustrated embodiment, the data lines may be organized in the form of 16 lower-order bits (i.e., two lower-order data bytes) and 16 higher-order bits (i.e., two higher-order data bytes), represented in FIG. 1 in the notation "DQ[0:15]" and "DQ[16:31]," respectively. In addition to the data lines, the memory bus 106 may include a first read strobe signal associated with the lower-order data bytes DQ[0:15] and a second read strobe signal associated with the higher-order data bytes DQ[16:31]. The first and second read strobe signals may be in the form of differential (i.e., a pair of true and complement) signals and represented in FIG. 1 in the notation "(RDQS0_$t$,RDQS0_$c$)" and "(RDQS1_$t$, RDQS0_$c$)," respectively. The memory bus 106 may further include a first data clock signal associated with the lower-order data bytes DQ[0:15] and a second data clock signal associated with the higher-order data bytes DQ[16:31]. The first and second data clock signals may be in the form of differential signals and represented in FIG. 1 in the notation "(WCK0_$t$,WCK0_$c$)" and "(WCK1_$t$,WCK0_$c$)," respectively. The memory bus 106 may still further include a first data mask inversion signal ("DMI0") associated with the lower-order data bytes DQ[0:15] and a second data mask inversion signal ("DMI1") associated with the higher-order data bytes DQ[16:31].

The lower-order data byte signals DQ[0:15], the first data mask inversion signal DMI0, the first data clock signal (WCK0_$t$,WCK0_$c$), and the first read strobe signal (RDQS0_$t$,RDQS0_$c$) may be coupled to the first I/O interface 110A. The higher-order data byte signals DQ[16:31], the second data mask inversion signal DMI1, the second data clock signal (WCK1_$t$,WCK1_$c$), and the second read strobe signal (RDQS1_$t$,RDQS1_$c$) may be coupled to the second I/O interface 110B.

Another portion of the memory bus 106 may include control signals. The control signals may include a command and address ("CA") bus. The CA bus may be of any size and represented in FIG. 1 in the notation "CA[0:n]." The control signals may also include a clock signal associated with the CA bus. The clock signal associated with the CA bus may be in the form of differential signals and represented in FIG. 1 in the notation "(CK_t,CK_c)." The control signals may further include a chip-select ("CS") signal and a reset ("RESET") signal. The DRAM device 104 may include a command/address and clock interface 112 configured to receive the control signal portion of the memory bus 106.

Conceptually, the memory bus 106 may be configured as two pseudo-channels: a first pseudo-channel 114A and a second pseudo-channel 114B. The first pseudo-channel 114A (also referred to as "PC0") may include the lower-order data byte signals DQ[0:15], the first data mask inversion signal DMI0, the first data clock signal (WCK0_$t$, WCK0_$c$), the first read strobe signal (RDQS0_$t$, RDQS0_$c$), the clock signal (CK_t,CK_c) associated with the CA bus, the chip-select signal, and the reset signal. The second pseudo-channel 114B (also referred to as "PC1") may include the higher-order data byte signals DQ[16:31], the second data mask inversion signal DMI1, the second data clock signal (WCK1_$t$,WCK1_$c$), the second read strobe signal (RDQS1_$t$,RDQS1_$c$), the clock signal (CK_t, CK_c) associated with the CA bus, the chip-select signal, and the reset signal. Note that the control signal portion of the memory bus, comprising the clock signal (CK_t,CK_c) associated with the CA bus, the chip-select signal, and the reset signal, is shared by or common to the first pseudo-channel 114A and a second pseudo-channel 114B. The first and second pseudo-channels 114A and 114B are referred to herein as "pseudo" channels rather than actual channels because they share their control signals.

The SoC 102 may include a physical memory interface or "PHY" 116 coupled to the memory bus 106 and a memory controller 118 coupled to the PHY 116. Through a bus-like interconnect 120 (sometimes referred to as a fabric), the memory controller 118 may communicate with any of various processing engines 122, such as, for example, a multi-core central processing unit ("CPU") 121A, a graphics processing unit ("GPU") and multi-media engine 122B, a neural processing unit ("NPU") 122C, etc. Any of the processing engines 122 may act as a client device with respect to the DRAM device 104 to initiate memory access operations with the DRAM device 104 through the memory controller 118. Although in the embodiment illustrated in FIG. 1 there are three client devices, in other embodiments there may be any number of client devices.

Figure 2A:
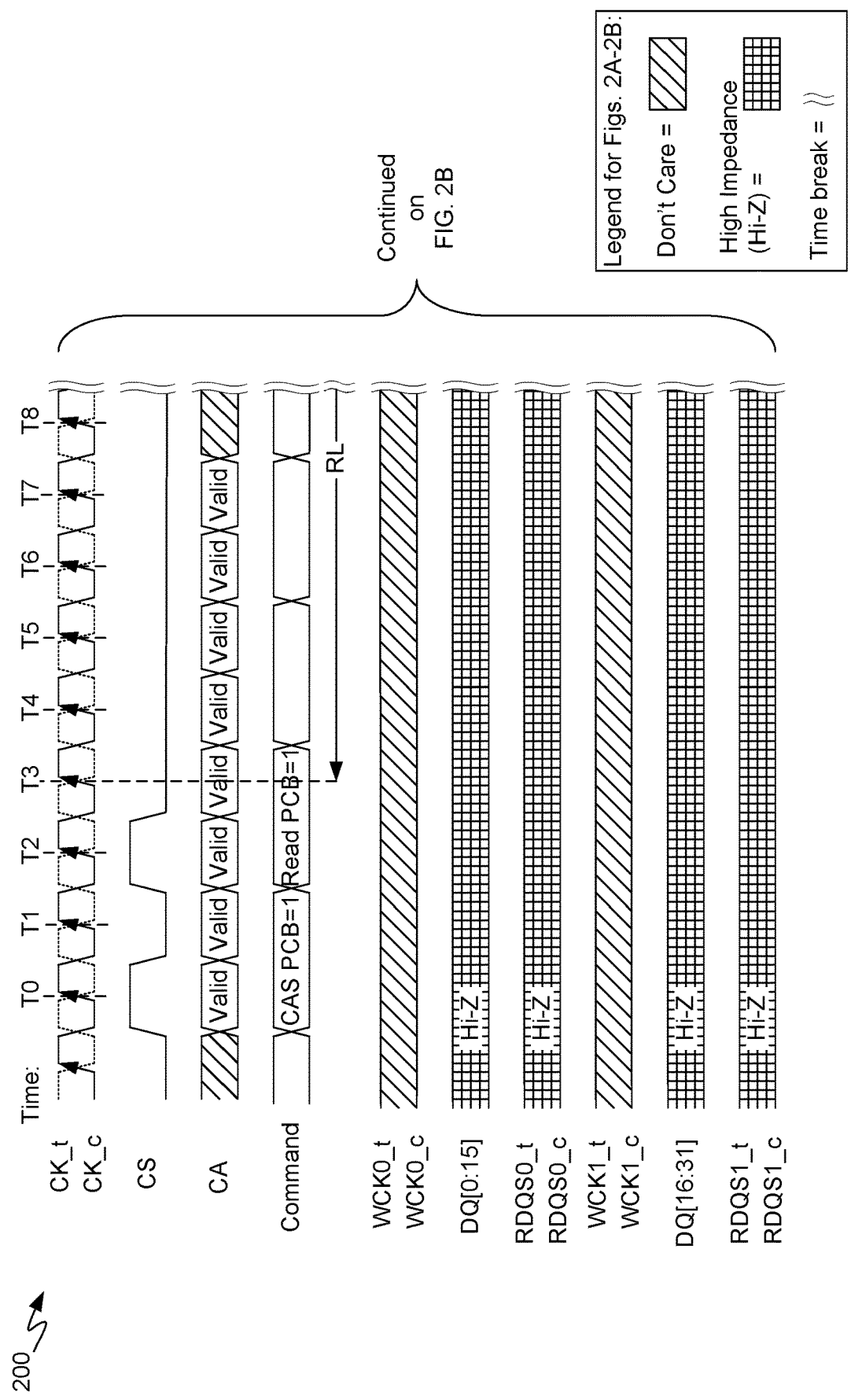
FIG. 2A is a timing diagram illustrating an example of operation of the system of FIG. 1, in accordance with exemplary embodiments.
Figure 2B:
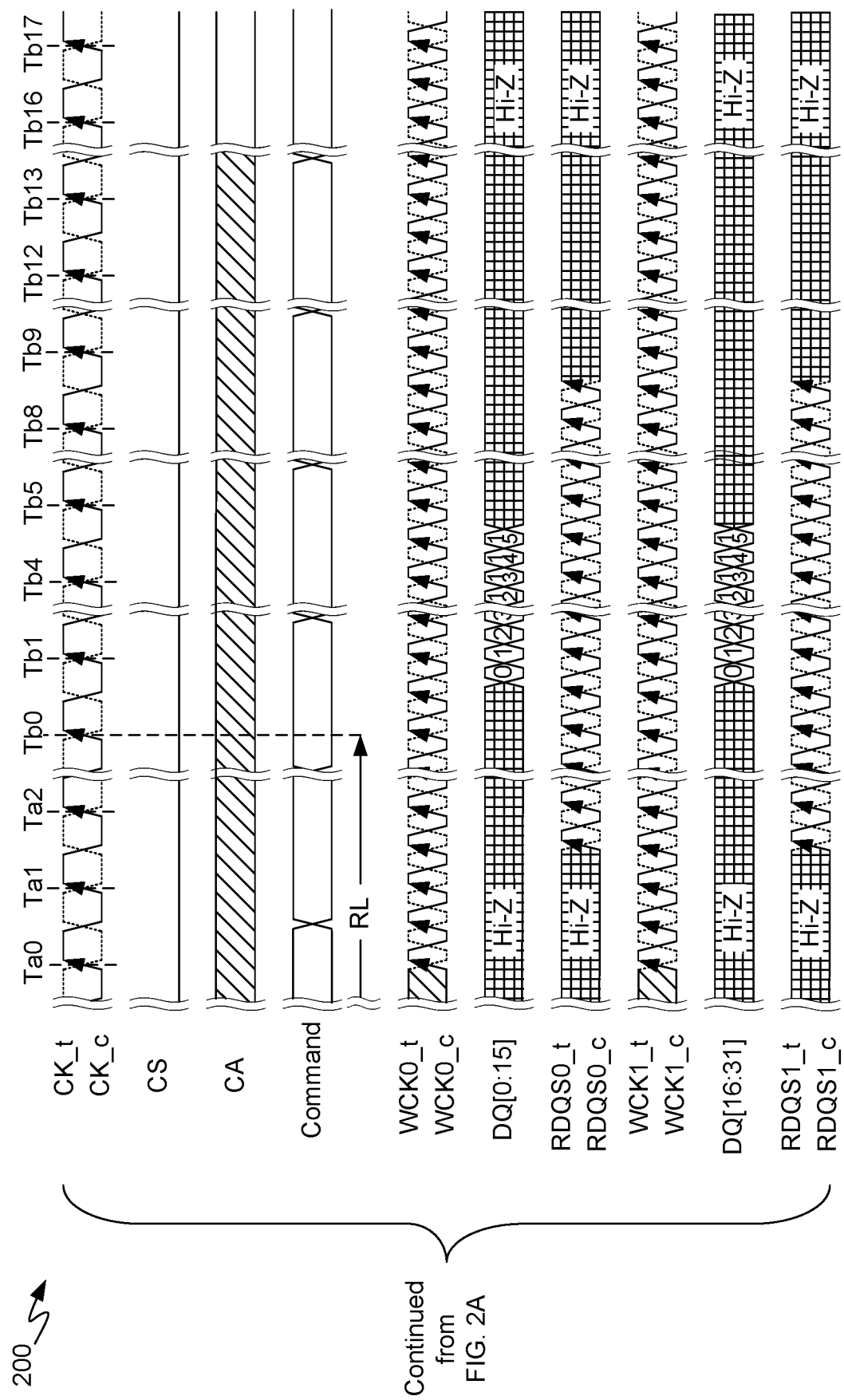
FIG. 2B is a continuation of the timing diagram of FIG. 2A.

In FIGS. 2A-2B, a timing diagram 200 illustrates an example of operation of the above-described system 100 (FIG. 1). With additional reference to FIG. 1, the exemplary operation (timing diagram 200) represents the memory controller 118 concurrently receiving (via the PHY 116) a first portion of some requested data from the DRAM (i.e., DRAM device 104) via the first pseudo-channel 114A and a second portion of the requested data from the DRAM via the second pseudo-channel 114B. This operation illustrated in the timing diagram 200 is referred to herein as a "broadcast" mode. As described below, the system 100 may selectively perform memory read operations in the broadcast mode or in a non-broadcast mode. The memory controller 118 may initiate the data access in response to a request received from a client device, as further described below.

As illustrated in FIG. 2A, before a time T0 and through a time T1 the memory controller 118 may issue a CAS command that includes a pseudo-channel broadcast ("PCB") mode indication set to a state that indicates the broadcast mode. For example, a predetermined bit of the CAS command may be a PCB mode bit set to a value of "1" (i.e., PCB=1) to indicate the broadcast mode. Then, before a time T2 and through a time T3 the memory controller 118 may issue a Read command. The Read command may likewise include a PCB mode bit set to a value of "1" (i.e., PCB=1) to indicate the broadcast mode. For brevity, in FIG. 2A the notation "CAS PCB=1" indicates the CAS command and "Read PCB=1" indicates the Read command, but it should be understood that the commands may include other bits. For example, a write clock-to-clock sync option bit may be asserted: WS_RD=1.

The Read command may include an indication of the amount of data requested, such as 64 bytes in the example illustrated in FIGS. 2A-2B. The Read command may also include a burst length ("BL") indication, such as a burst length of 16 in the example illustrated in FIGS. 2A-2B. As well understood by one of ordinary skill in the art, the chip-select signal may be asserted during the CAS and Read commands. Other aspects of the timing diagram 200 and corresponding configurations of the memory controller 118 and DRAM device 104 (FIG. 1), etc., which are similarly well understood by one of ordinary skill in the art are not described herein for brevity.

Continuing in FIG. 2B, in response to the Read command, a first 32-byte portion of the requested 64 bytes of data may arrive from the DRAM (DRAM device 104) on the first pseudo-channel 114A portion of the memory bus 106 (FIG. 1), i.e., DQ[0:15], after a delay or time interval beginning at time T3. This time interval may be equal to a read latency ("RL"), which begins at time T3, plus four cycles of the clock signal (WCK0_t,CK_c) or read strobe signal (RDQS0_t,RDQS0_c). In a notation in which "nCK" means "number of clock cycles," this time interval may be expressed as RL+4nCK, i.e., RL plus four clock cycles. Similarly, in response to the Read command, a second 32-byte portion of the requested 64 bytes of data may arrive from the DRAM on the second pseudo-channel 114B portion of the memory bus 106, i.e., DQ[16:31], after the same delay or time interval beginning at time T3: RL+4nCK. That is, when a read operation is performed in broadcast mode the first and second portions of the requested amount of data arrive concurrently with each other on the first and second pseudo-channels 114A and 114B, respectively, after a time interval of RL+4nCK. Although not shown in the timing diagram 200, the memory controller 118 then conveys the requested data back to the requesting client device.

Figure 3A:
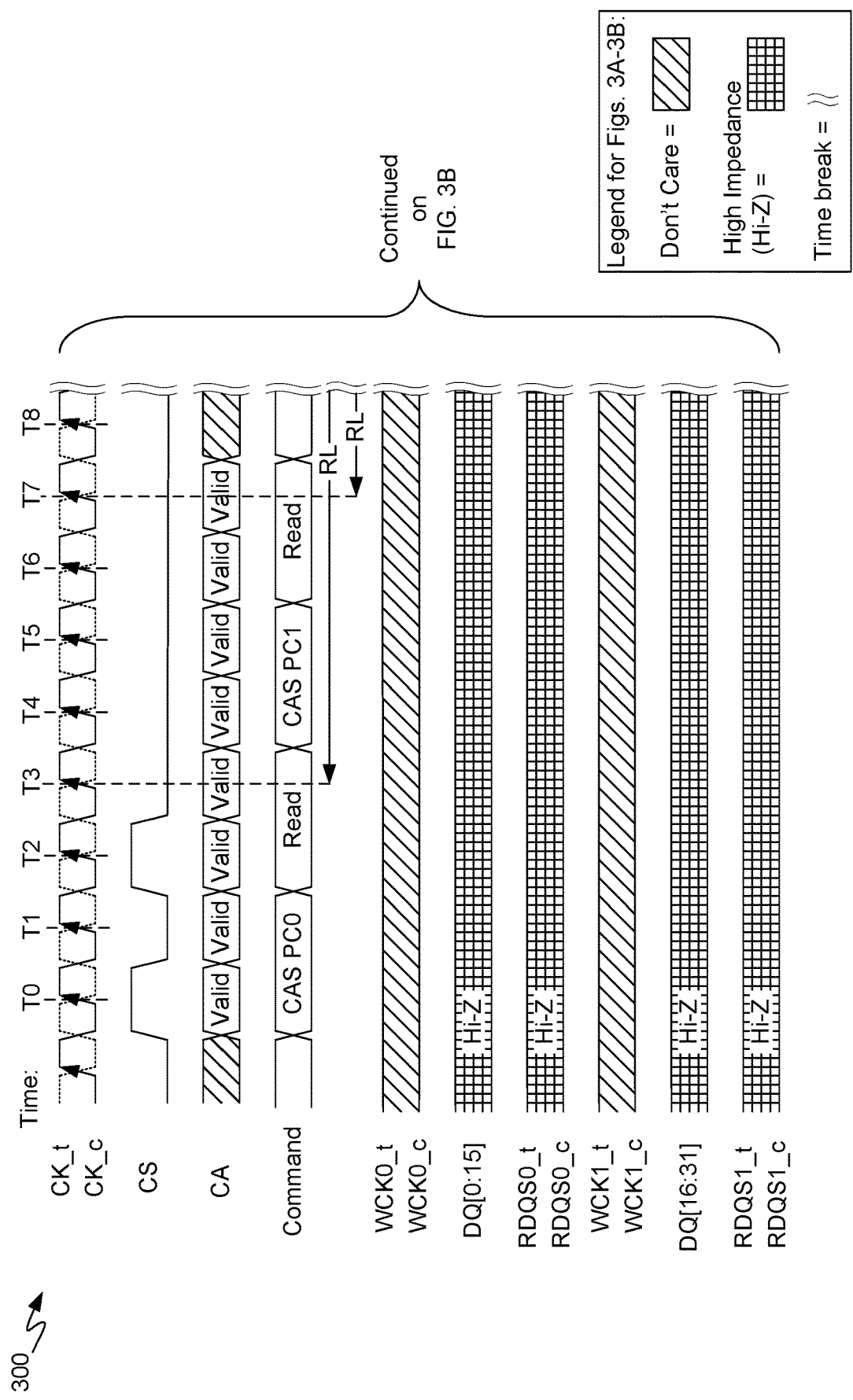
FIG. 3A is a timing diagram illustrating another example of operation of the system of FIG. 1, in accordance with exemplary embodiments.
Figure 3B:
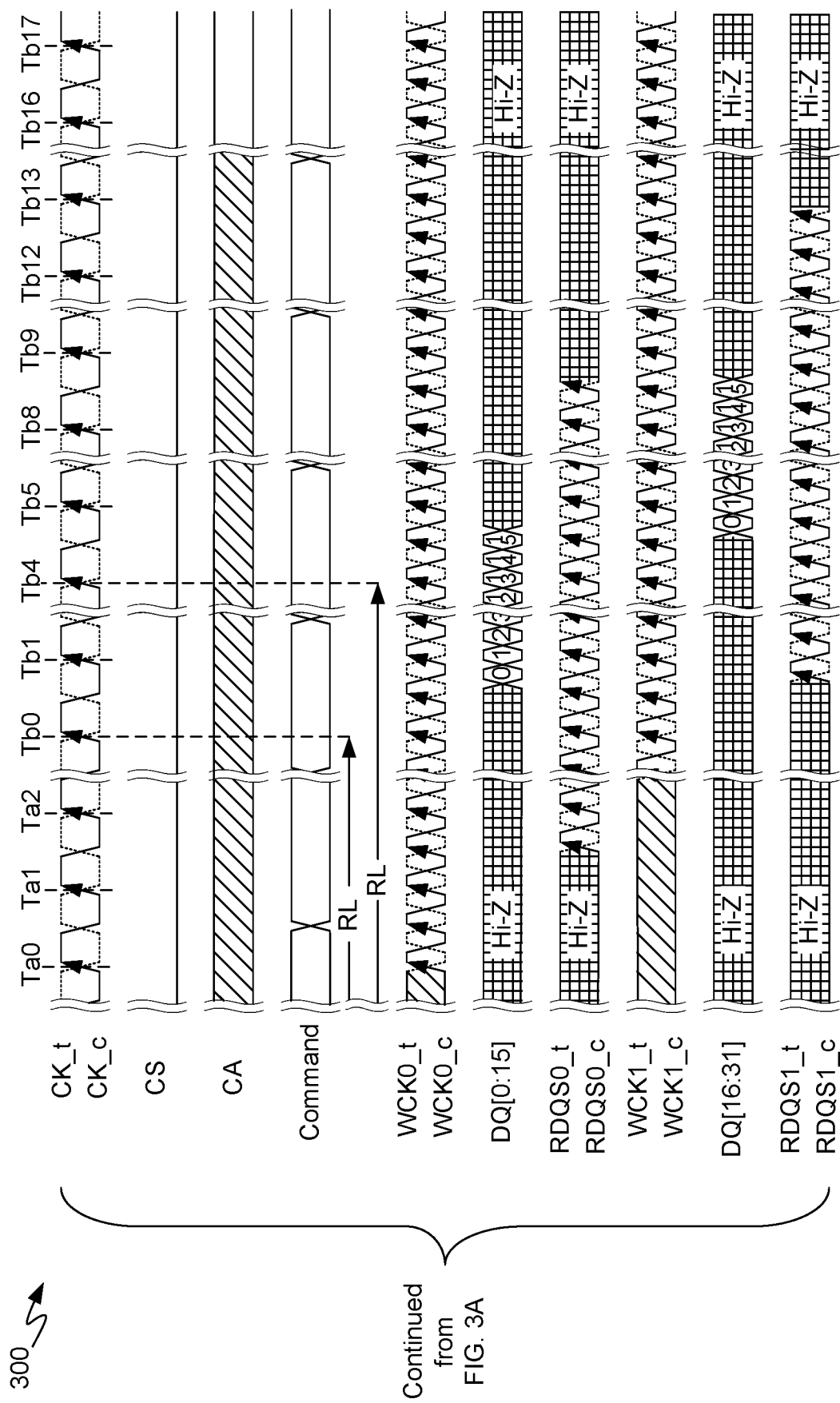
FIG. 3B is a continuation of the timing diagram of FIG. 3A.

In FIGS. 3A-3B, a timing diagram 300 illustrates another example of operation of the above-described system 100 (FIG. 1). With reference to FIG. 1, the exemplary operation (timing diagram 300) represents the memory controller 118 sequentially receiving (via the PHY 116) a first portion of some requested data from the DRAM (i.e., DRAM device 104) via the first pseudo-channel 114A and a second portion of the requested data from the DRAM via the second pseudo-channel 114B. The timing diagram 300 illustrates an example of the system 100 operating in a "non-broadcast" mode.

As illustrated in FIG. 3A, before a time T0 and through a time T1 the memory controller 118 may issue a first CAS command that includes the PCB mode indication set to a state that indicates the non-broadcast mode as well as a pseudo-channel selection indication ("PCS") set to a state that indicates a selected one of the first and second pseudo-channels 114A (PC0) and 114B (PC1). In the illustrated example, the above-described PCB mode bit may be set to a value of "0" (i.e., PCB=0) to indicate the non-broadcast mode. Another predetermined bit of the first CAS command may be a PCS bit set to a value of "0" (i.e., PCS=0) to indicate selection of the first pseudo-channel 114A (PC0) in the illustrated example. Then, before a time T2 and through a time T3 the memory controller 118 may issue a first Read command. The first Read command may likewise include the PCB mode bit set to a value of "0" to indicate the non-broadcast mode and the PCS bit set to a value of "0" to indicate selection of the first pseudo-channel 114A (PC0). For brevity, in FIG. 3A the notation "CAS PC0" indicates the first CAS command and "Read" indicates the first Read command, but it should be understood that in this example the first CAS command and first Read command include PCB=0 and PCS=0. The first CAS command may also include other bits that are similarly not indicated in FIG. 3A for brevity, such as WS_RD=1.

Before a time T4 and through a time T5 the memory controller 118 may issue a second CAS command that includes the PCB mode indication set to a state that indicates the non-broadcast mode and the PCS indication set to a state that indicates selection of the second pseudo-channel 114B (PC1). That is, in the illustrated example: PCB=0 and PCS=1. Then, before a time T6 and through a time T7 the memory controller 118 may issue a second Read command. The second Read command may likewise include the PCB mode bit set to a value of "0" to indicate the non-broadcast mode and the PCS bit set to a value of "0" to indicate selection of the first pseudo-channel 114A (PC0). For brevity, in FIG. 3A the notation "CAS PC1" indicates the second CAS command and "Read" indicates the second Read command, but it should be understood that in this example the second CAS command and second Read command include PCB=0 and PCS=1. The second CAS command may also include other bits that are similarly not indicated in FIG. 3A for brevity, such as WS_RD=1.

Each of the first and second Read commands may also include an indication of the amount of data requested, such as, for example, 32 bytes, for a total of 64 bytes of requested data in the example illustrated in FIGS. 3A-3B. The Read commands may also include a BL indication of 16 in the example illustrated in FIGS. 3A-3B. Other aspects of the timing diagram 300 and corresponding configurations of the memory controller 118 and DRAM device 104 (FIG. 1), etc., which are well understood by one of ordinary skill in the art are not described herein for brevity.

Continuing in FIG. 3B, in response to the first Read command, a first 32-byte portion of the requested 64 bytes of data may arrive from the DRAM on the first pseudo-channel 114A portion of the memory bus 106 (FIG. 1), i.e., DQ[0:15], after a delay or time interval beginning at time T3 (FIG. 3A). Similarly, in response to the second Read command, a second 32-byte portion of the requested 64 bytes of data may arrive from the DRAM on the second pseudo-channel 114B portion of the memory bus 106, i.e., DQ[16:31], after another delay or time interval beginning at time T7 (FIG. 3A). When a read operation is performed in a non-broadcast mode the first and second portions of the requested amount of data arrive sequentially with each other on the first and second pseudo-channels 114A (PC0) and 114B (PC1), respectively, in response to the first and second Read commands, respectively. That is, when a read operation is performed in a non-broadcast mode the first portion of the requested data arrives first on DQ[0:15], and the second portion of the requested data arrives on DQ [15:31] after the first portion of the requested data has arrived on DQ[0:15]. The total delay or time interval from the first Read command to the arrival of all 64 bytes of the requested data is RL+8nCK in the example illustrated in FIGS. 3A-3B. Although not shown in the timing diagram 300, the memory controller 118 then conveys the requested data back to the requesting client device.

Figure 4A:
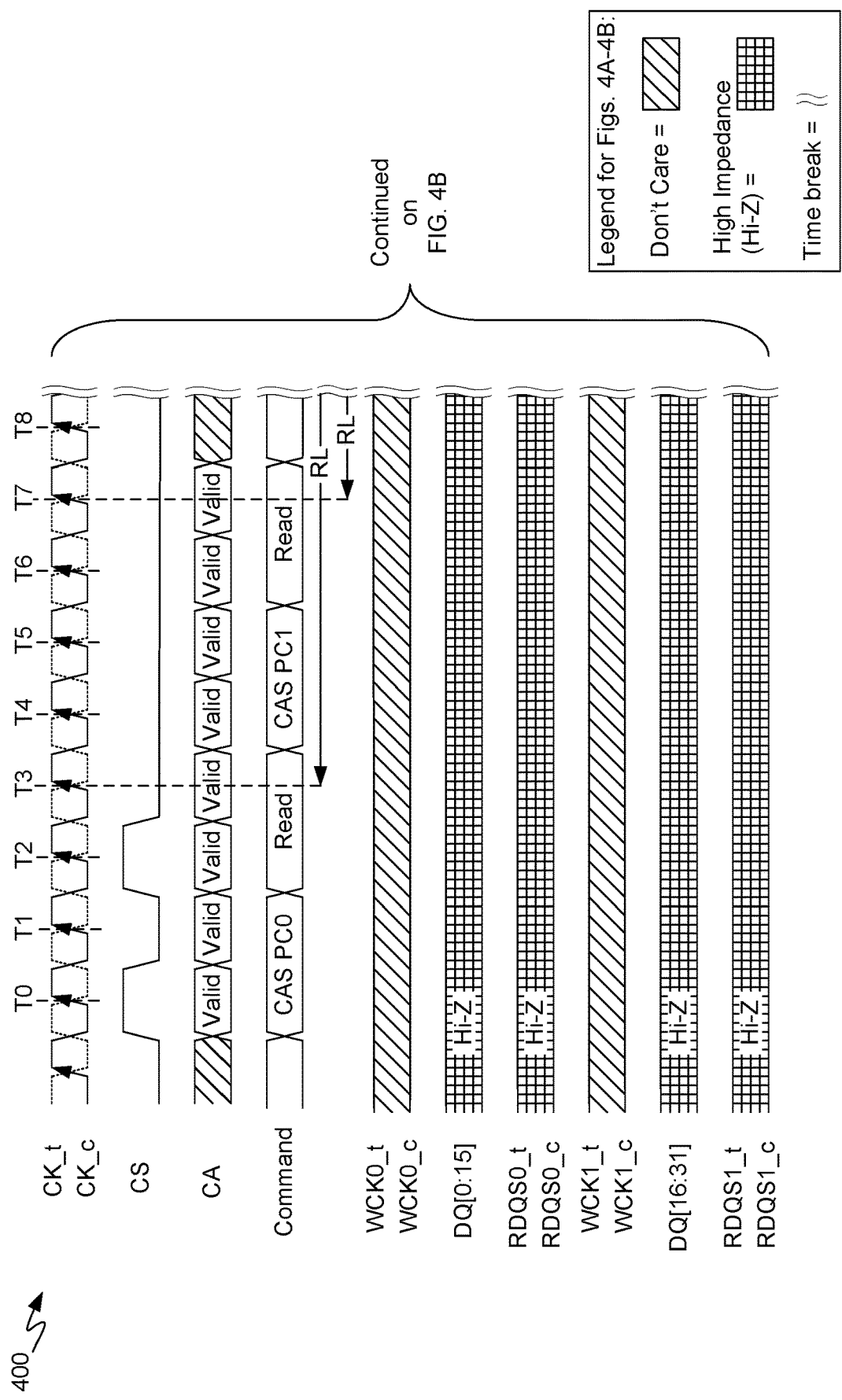
FIG. 4A is a timing diagram illustrating still another example of operation of the system of FIG. 1, in accordance with exemplary embodiments.
Figure 4B:
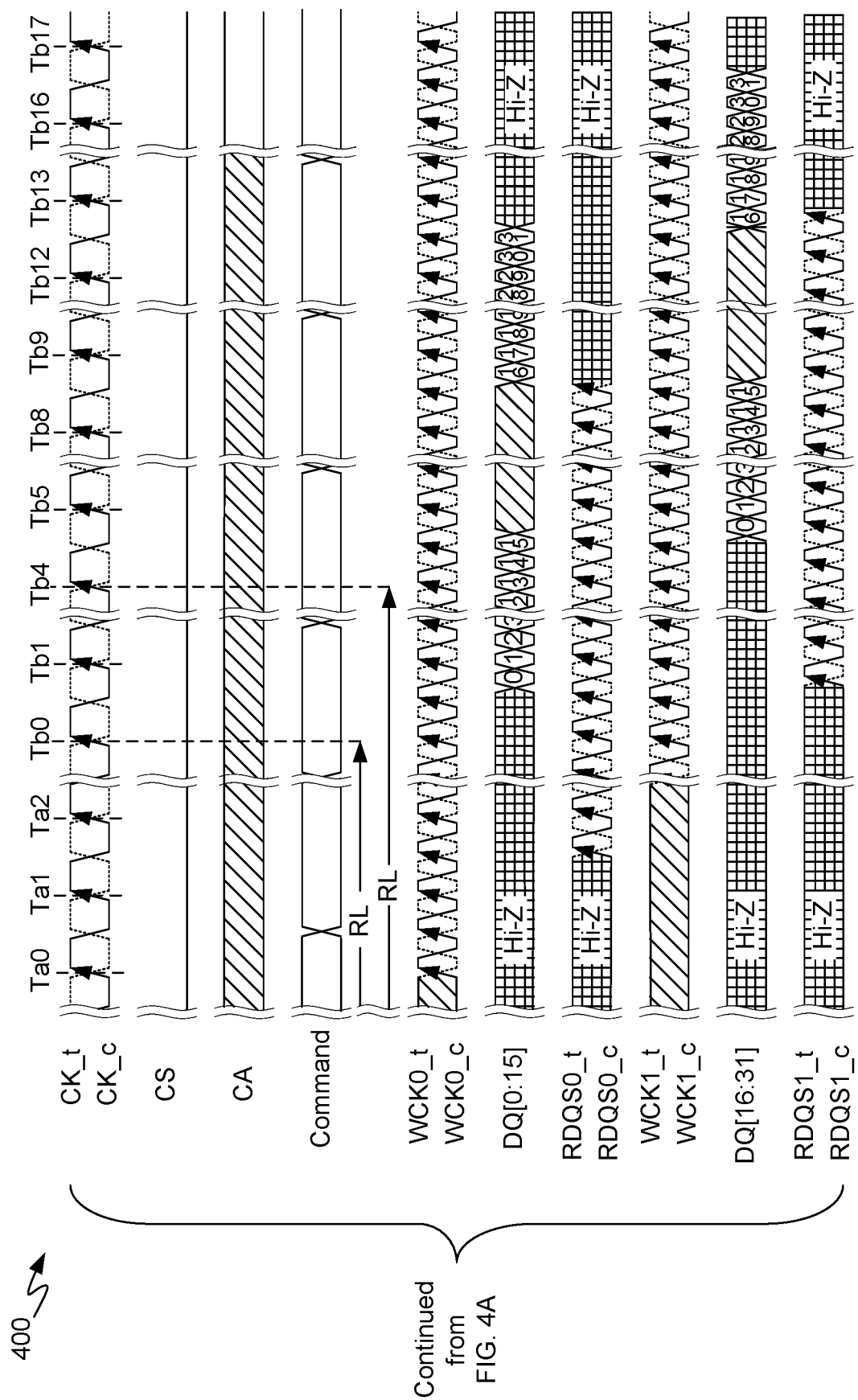
FIG. 4B is a continuation of the timing diagram of FIG. 4A.

In FIGS. 4A-4B, a timing diagram 400 illustrates still another example of operation of the above-described system 100 (FIG. 1). With reference to FIG. 1, the exemplary operation (timing diagram 400) represents the memory controller 118 sequentially receiving (via the PHY 116) a first portion of some requested data from the DRAM (i.e., DRAM device 104) via the first pseudo-channel 114A and a second portion of the requested data from the DRAM via the second pseudo-channel 114B. The timing diagram 400 illustrates another example of the system 100 operating in the "non-broadcast" mode.

As illustrated in FIG. 4A, before a time T0 and through a time T1 the memory controller 118 may issue a first CAS command that includes the PCB mode indication set to a state that indicates the non-broadcast mode as well as the PCS indication set to a state that indicates selection of the first pseudo-channel 114A (PC0). That is, in the illustrated example: PCB=0 and PCS=0. Then, before a time T2 and through a time T3 the memory controller 118 may issue a first Read command. The first Read command may likewise include the PCB mode bit set to a value of "0" to indicate the non-broadcast mode and the PCS bit set to a value of "0" to indicate selection of the first pseudo-channel 114A (PC0). For brevity, in FIG. 4A the notation "CAS PC0" indicates the first CAS command and "Read" indicates the first Read command, but it should be understood that in this example the first CAS command and first Read command include PCB=0 and PCS=0. The first CAS command may also include other bits that are similarly not indicated in FIG. 4A for brevity, such as WS_RD=1.

Before a time T4 and through a time T5 the memory controller 118 may issue a second CAS command that includes the PCB mode indication set to a state that indicates the non-broadcast mode and the PCS indication set to a state that indicates selection of the second pseudo-channel 114B (PC1). That is, in the illustrated example: PCB=0 and PCS=1. Then, before a time T6 and through a time T7 the memory controller 118 may issue a second Read command. The second Read command may likewise include the PCB mode bit set to a value of "0" to indicate the non-broadcast mode and the PCS bit set to a value of "0" to indicate selection of the first pseudo-channel 114A (PC0). For brevity, in FIG. 4A the notation "CAS PC1" indicates the second CAS command and "Read" indicates the second Read command, but it should be understood that in this example the second CAS command and second Read command include PCB=0 and PCS=1. The second CAS command may also include other bits that are similarly not indicated in FIG. 4A for brevity, such as WS_RD=1.

Each of the first and second Read commands may also include an indication of the amount of data requested, such as, for example, 64 bytes (per Read command) in the example illustrated in FIGS. 4A-4B. The Read commands may also include a BL indication of 32 in the example illustrated in FIGS. 4A-4B. Other aspects of the timing diagram 400 and corresponding configurations of the memory controller 118 and DRAM device 104 (FIG. 1), etc., which are well understood by one of ordinary skill in the art are not described herein for brevity.

Continuing in FIG. 4B, in response to the first Read command, a first 32-byte portion of the requested data may arrive from the DRAM on the first pseudo-channel 114A (PC0), i.e., DQ[0:15], after a delay or time interval beginning at time T3 (FIG. 4A). Similarly, in response to the second Read command, a second 32-byte portion of the requested data may arrive from the DRAM on the second pseudo-channel 114B (PC1), i.e., DQ[16:31], after another delay or time interval beginning at time T7 (FIG. 4A). Then, again in response to the first Read command, a third 32-byte portion of the requested data may arrive from the DRAM on the first pseudo-channel 114A (PC0), i.e., DQ[0:15]. And again in response to the second Read command, a fourth 32-byte portion of the requested data may arrive from the DRAM on the second first pseudo-channel 114B (PC1), i.e., DQ[16:31]. That is, a first 64 bytes of the requested data arrive on DQ[0:15] and a second 64 bytes of the requested data arrive on DQ [15:31]. The delay or time interval from the first Read command to the arrival of 64 bytes of the requested data on DQ[0:15] in this example is RL+12nCK. Likewise, the delay or time interval from the second Read command to the arrival of 64 bytes of the requested data on DQ[16:31] in this example is RL+12nCK. Although not shown in the timing diagram 300, the memory controller 118 then conveys the requested data back to the requesting client device.

It should be understood that the examples of operation of the system 100 (FIG. 1) described above with regard to the timing diagrams 200 (FIGS. 2A-2B), 300 (FIGS. 3A-3B) and 400 (FIGS. 4A-4B) are not the only examples. Additional examples of operation of the system 100 will occur readily to one of ordinary skill in the art in view of the teachings herein. For example, while the above-described examples of operation of the system 100 relate to read accesses, there may be additional examples that relate to write accesses. Also, it should be understood that while the timing diagrams 200-400 illustrate some significant aspects of operation of the system 100, there may be other aspects that are not illustrated in the timing diagrams 200-400, such as aspects that are well understood by one of ordinary skill in the art. For example, as understood by one of ordinary skill in the art, there may be various other commands that the memory controller may issue in association with a DRAM access sequence, such as Activate ("ACT"), Pre-charge ("PRE"), etc.

Figure 5:
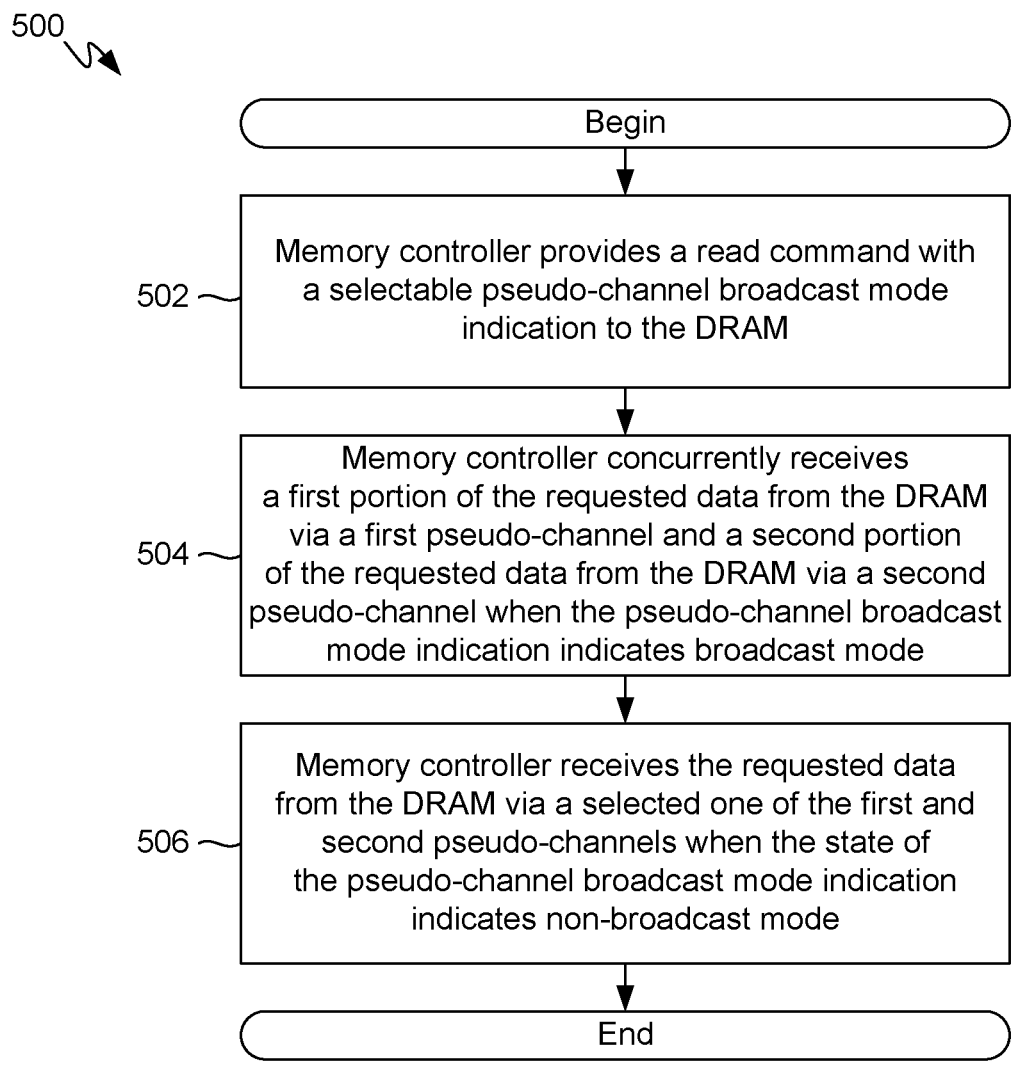
FIG. 5 is a flow diagram illustrating a method for accessing data in a DRAM, in accordance with exemplary embodiments.

In FIG. 5, a method 500 for reading data from a DRAM is illustrated in flow diagram form. As indicated by block 502, a memory controller may provide a Read command having a selectable PCB mode indication to a DRAM. The first Read command is associated with a request for data (e.g., by a client device). As indicated by block 504, in response to the Read command, when the state of the PCB mode indication indicates the broadcast mode the memory controller may concurrently receive first and second portions of the requested data from the DRAM via first and second pseudo-channels, respectively. As indicated by block 504, in response to the Read command, when the state of the PCB mode indication indicates the non-broadcast mode, the memory controller may receive the requested data from the DRAM via a selected one of the first and second pseudo-channels. The Read command may include a PCS indication, indicating which of the first and second pseudo-channels is selected.

Figure 6:
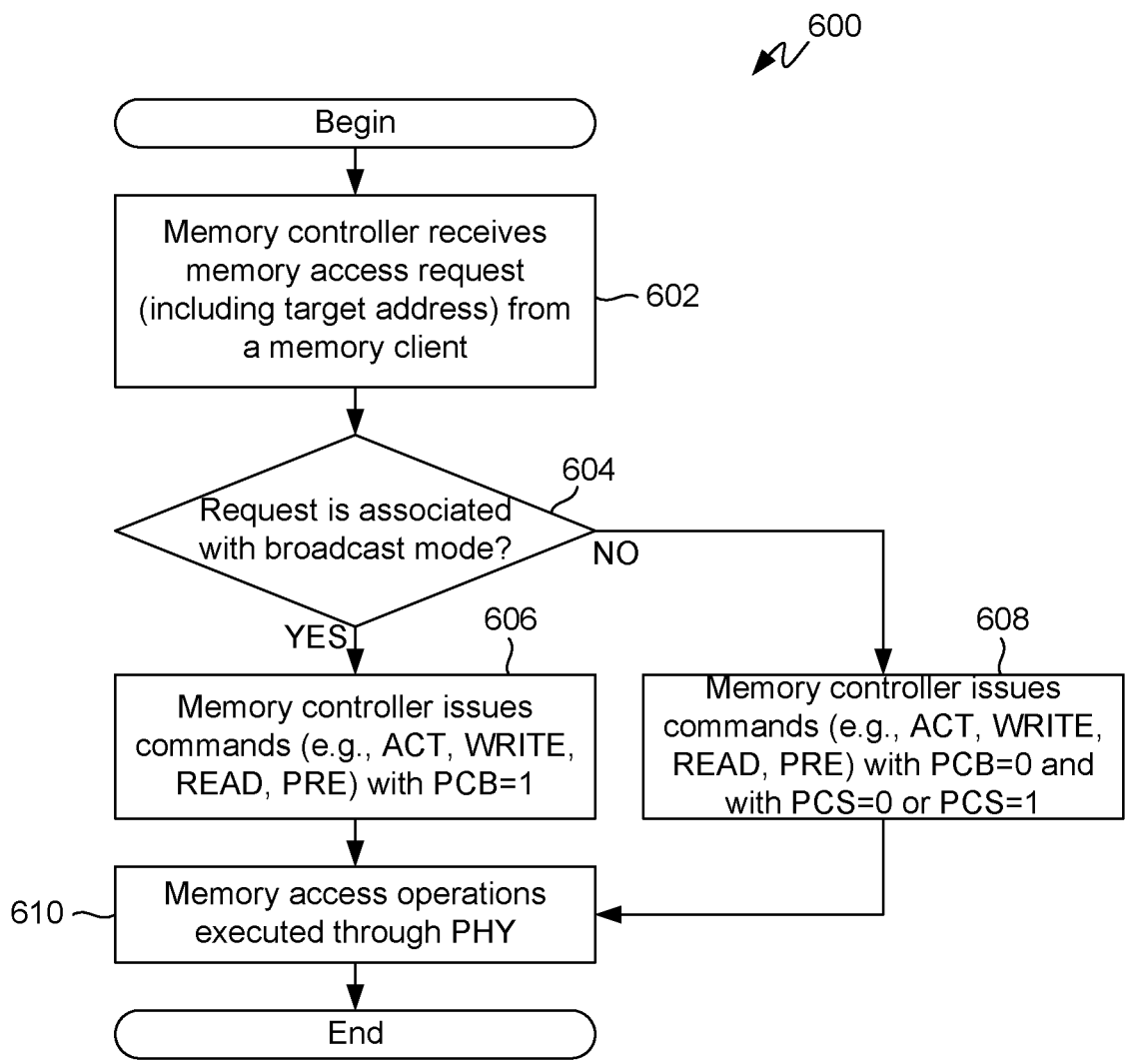
FIG. 6 is a flow diagram illustrating a method for issuing memory commands based on memory access requests, in accordance with exemplary embodiments.

In FIG. 6, a method 600 for controlling memory access requests is illustrated in flow diagram form. As indicated by block 602, a memory controller may receive a memory access request from a client device. The memory access request may include a target address and may also include other information, such as, for example, a flag, access priority indication, etc.

As indicated by block 604, the memory controller may determine whether a received memory access request is associated with the broadcast mode. Whether the memory access request is associated with the broadcast mode may be determined in any way. In an exemplary embodiment, a memory access request having a target address within a first range may be associated with the broadcast mode. That is, if the target address is within the first range, then the memory access request is associated with the broadcast mode. But if the target address is not within the first range, then the memory access request is not associated with the broadcast mode (and thus may be associated with the non-broadcast mode). Different types of client devices may issue memory access requests having target addresses within different address ranges based on client type. For example, a CPU may use target addresses within a first range, while a GPU may use target addresses within a range other than the first range (i.e., a second range), etc. In another exemplary embodiment, a memory access request may include a flag. If the memory access request includes the flag, then the memory access request is associated with the broadcast mode. But if the memory access request does not include the flag, then the memory access request is not associated with the broadcast mode (and thus may be associated with the non-broadcast mode). Different client devices may include or not include the flag in their memory access requests. In still another exemplary embodiment, whether a memory access request is associated with the broadcast mode may be determined based on a memory access priority associated with the requesting client device.

As indicated by block 606, if the memory controller determines that the memory access request is associated with the broadcast mode, then the memory controller may set the PCB mode indication (e.g., to "1") to indicate the broadcast mode in any of various commands the memory controller may issue in association with the memory access request. Such commands may include, for example, activate ("ACT"), write ("WRITE"), read ("READ"), pre-charge ("PRE"), etc. As indicated by block 608, if the memory controller determines that the memory access request is not associated with the broadcast mode, then the memory controller may set the PCB mode indication (e.g., to "0") to indicate the non-broadcast mode in any of such commands. As indicated by block 610, the memory controller may cause the memory access operations to be executed through a physical interface or PHY coupled to the DRAM by a memory bus.

Figure 7:
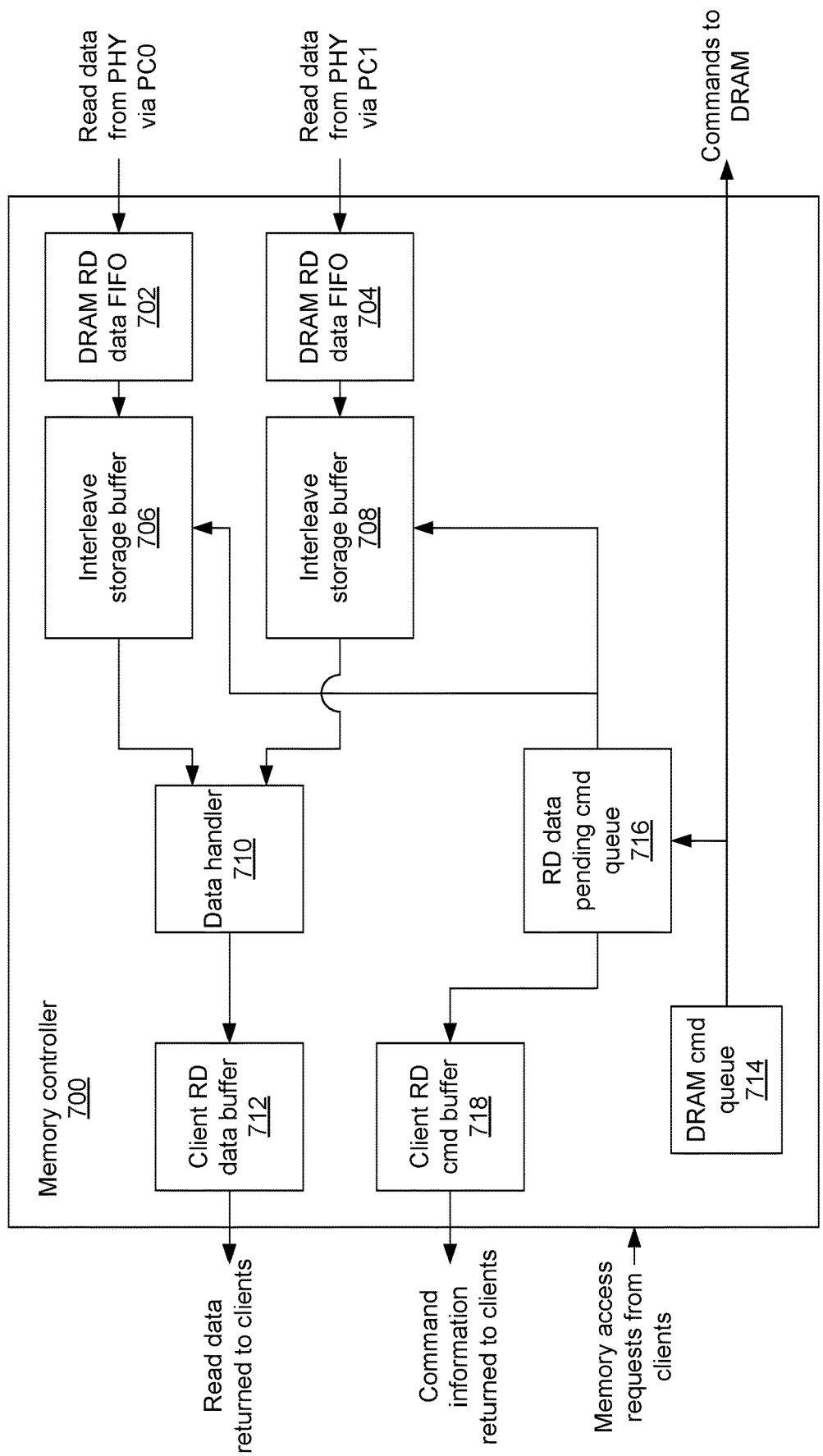
FIG. 7 is a block diagram of a memory controller, in accordance with exemplary embodiments.

As illustrated in FIG. 7, a memory controller 700 may include a first DRAM read data first-in-first-out ("FIFO") buffer 702, a second DRAM read data FIFO buffer 704, a first interleave storage buffer 706, a second interleave storage buffer 708, a data handler 710, a client read data buffer 712, a DRAM command queue 714, a read data pending command queue 716, and a client Read command buffer 718. The memory controller 700 may be an example of the above-described memory controller 118 (FIG. 1). It should be understood that the memory controller 700 is shown in conceptual form in FIG. 7, and the foregoing elements may be configured in operation by control logic (not shown), such as, for example, through operation of one or more processors (as configured by software or firmware), through operation of one or more finite state machines, or through operation of any other type of control logic. Also not shown in FIG. 7 are elements of the memory controller 700 relating to memory controller functions other than those described herein. For example, in addition to the memory controller functions described herein, the memory controller 700 may be configured to generate command sequences in response to the memory access requests received from client devices or in response to other conditions. Such other conditions may include, for example, a requirement of the DRAM to be periodically refreshed, and the memory controller 700 may be configured to generate refresh-related commands.

The DRAM command queue 714 may be configured to temporarily store commands generated in the manner described above before sending the commands on to the DRAM via the PHY (not shown in FIG. 7). The read data pending command queue 716 may be configured to temporarily store command information identifying each Read command sent to the DRAM until the memory controller 700 receives the read data from the DRAM in response to that Read command. The first DRAM FIFO buffer 702 may be configured to store read data received from the DRAM through the first pseudo-channel PC0. The second DRAM read data FIFO buffer 704 may be configured to store read data received from the DRAM through the second pseudo-channel PC1.

In an example of operation in which each of two successive Read commands requests 32 bytes of data, the first DRAM read data FIFO buffer 702 and the second DRAM read data FIFO buffer 704 each may be configured to receive 128 bits of read data from the PHY in response to each Read command. The first DRAM read data FIFO buffer 702 and the second DRAM read data FIFO buffer 704 each may be configured to receive 256 bits of read data in two memory controller clock cycles. The first and second interleave storage buffers 706 and 708 may be configured to store data that is output by the first and second DRAM read data FIFO buffers 702 and 704, respectively. In this example (of 32-byte requests), during a first memory controller clock cycle, the first interleave storage buffer 706 may send 128 bits of data received from the DRAM on the first pseudo-channel PC0 to the client read data buffer 712 via the data handler 710. In this example, during a second memory controller clock cycle, the first interleave storage buffer 706 may send another 128 bits of data received from the DRAM on the first pseudo-channel PC0 to the client read data buffer 712 via the data handler 710. Also, in this example, during a third memory controller clock cycle, the second interleave storage buffer 708 may send 128 bits of data received from the DRAM on the second pseudo-channel PC1 to the client read data buffer 712 via the data handler 710. Further, in this example, during a fourth memory controller clock cycle, the second interleave storage buffer 708 may send another 128 bits of data received from the DRAM on the second pseudo-channel PC1 to the client read data buffer 712 via the data handler 710. Thus, in this example (of 32-byte requests), in the first two memory controller clock cycles the client read data buffer 712 receives 32 bytes of data received from the DRAM on the first pseudo-channel PC0, and in the next two memory controller clock cycles the client read data buffer 712 receives 32 bytes of data received from the DRAM on the second pseudo-channel PC1. That is, in an example in which the data is received in response to 32-byte requests, in four memory controller clock cycles the client read data buffer 712 receives 32 bytes of read data from each of the first and second pseudo-channels PC0 and PC1.

As read data is stored in the client read data buffer 712, the read data pending command queue 716 may provide information identifying the Read commands associated with that read data to the client Read command buffer 718. The client read data buffer 712 and the client Read command buffer 718 are configured to send the received read data along with the information identifying the associated commands to the requesting client. Each read access request received from a client may include information, which may be referred to as a "client ID," identifying the requesting client. Based on the client ID, the read data and information identifying the commands may be sent together or otherwise in association with each other to the requesting client. As described above, each command may include a PCB mode indication, indicating whether the DRAM is to provide the requested data to the memory controller 700 in broadcast mode or in non-broadcast mode. The read data pending command queue 716 may use the PCB mode indications to control the interleave storage buffers 706 and 708.

In another example of operation, in which a Read command requests 64 bytes of data, the first DRAM read data FIFO buffer 702 and the second DRAM read data FIFO buffer 704 each may be configured to receive 128 bits of read data from the PHY in response to each Read command, as in the 32-byte request example described above. The first DRAM read data FIFO buffer 702 and the second DRAM read data FIFO buffer 704 each may be configured to receive 256 bits of read data in two memory controller clock cycles, as in the 32-byte request example described above. However, in this example (of 64-byte requests): during a first memory controller clock cycle, the first interleave storage buffer 706 may send 128 bits of data received from the DRAM on the first pseudo-channel PC0 to the client read data buffer 712; during a second memory controller clock cycle, the first interleave storage buffer 706 may send another 128 bits of data received from the DRAM on the first pseudo-channel PC0 to the client read data buffer 712; during a third memory controller clock cycle, the second interleave storage buffer 708 may send 128 bits of data received from the DRAM on the second pseudo-channel PC1 to the client read data buffer 712; during a fourth memory controller clock cycle, the second interleave storage buffer 708 may send another 128 bits of data received from the DRAM on the second pseudo-channel PC1 to the client read data buffer 712 via the data handler 710; during a fifth memory controller clock cycle, the first interleave storage buffer 706 may send still another 128 bits of data received from the DRAM on the first pseudo-channel PC0 to the client read data buffer 712; during a sixth memory controller clock cycle, the first interleave storage buffer 706 may send yet another 128 bits of data received from the DRAM on the first pseudo-channel PC0 to the client read data buffer 712; during a seventh memory controller clock cycle, the second interleave storage buffer 708 may send still another 128 bits of data received from the DRAM on the second pseudo-channel PC1 to the client read data buffer 712; and during an eighth memory controller clock cycle, the second interleave storage buffer 708 may send yet another 128 bits of data received from the DRAM on the second pseudo-channel PC1 to the client read data buffer 712.

Thus, in this example (of 64-byte requests): in the first two memory controller clock cycles the client read data buffer 712 receives 32 bytes of data received from the DRAM on the first pseudo-channel PC0; in the next two memory controller clock cycles the client read data buffer 712 receives 32 bytes of data received from the DRAM on the second pseudo-channel PC1; in the next two memory controller clock cycles the client read data buffer 712 receives 32 bytes of data received from the DRAM on the first pseudo-channel PC0; and in the next two memory controller clock cycles the client read data buffer 712 receives 32 bytes of data received from the DRAM on the second pseudo-channel PC1. That is, in an example in which the data is received in response to a 64-byte request, in eight memory controller clock cycles the client read data buffer 712 receives 64 bytes of read data from each of the first and second pseudo-channels PC0 and PC1.

Figure 8:
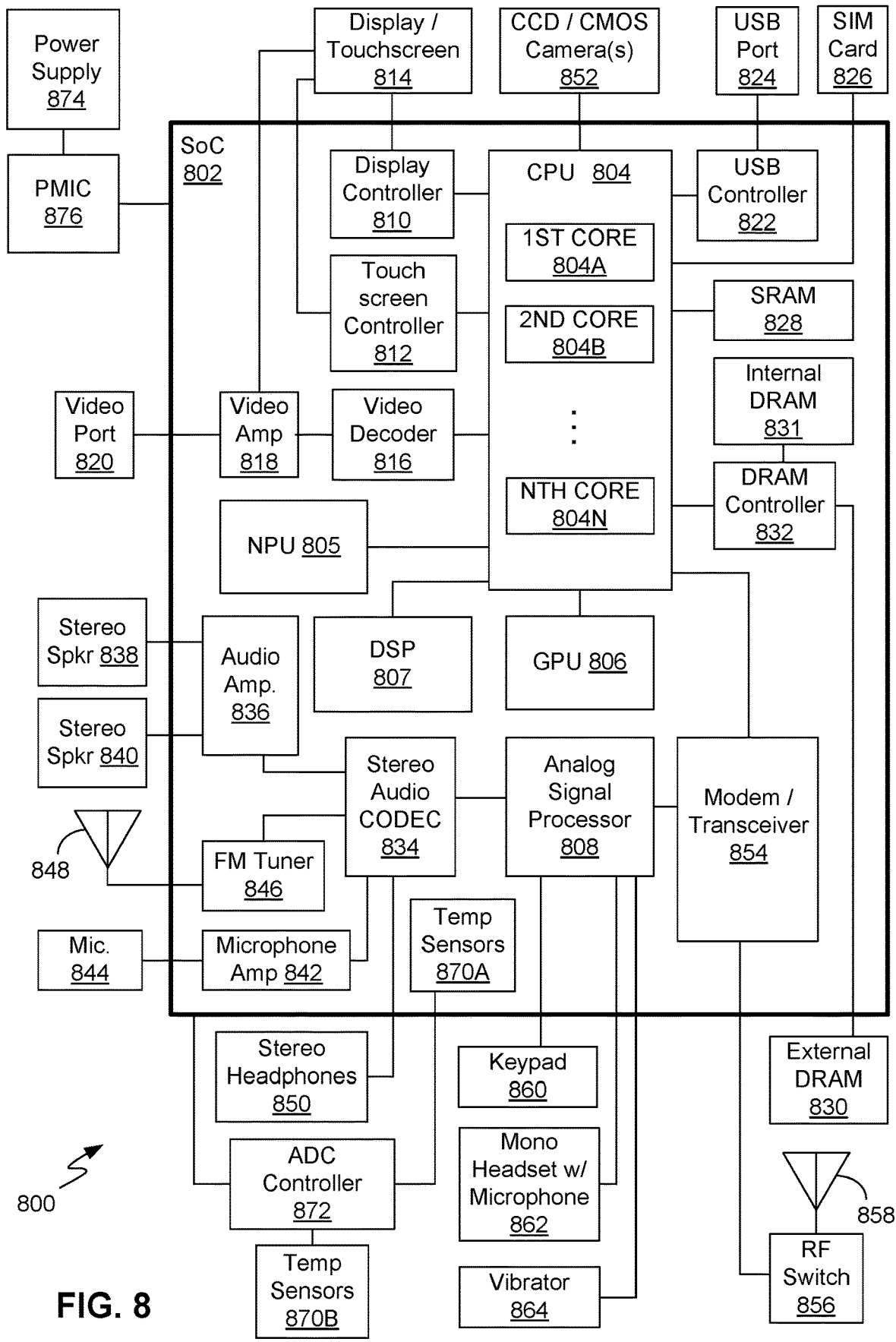
FIG. 8 is block diagram of a computing device, in accordance with exemplary embodiments.

In FIG. 8, an example of a portable computing device ("PCD") 800 in which exemplary embodiments of systems, methods, computer-readable media, and other examples in which accessing data in a DRAM may be provided is illustrated. For purposes of clarity, some data buses, clock signals, power supply voltages, etc., are not shown in FIG. 8.

The PCD 800 may include an SoC 802. The SoC 802 may include a CPU 804, an NPU 805, a GPU 806, a DSP 807, an analog signal processor 808, or other processors. The CPU 804 may include one or more CPU cores, such as a first CPU core 804A, a second CPU core 804B, etc., through an Nth CPU core 804N.

A display controller 810 and a touch-screen controller 812 may be coupled to the CPU 804. A touchscreen display 814 external to the SoC 802 may be coupled to the display controller 810 and the touch-screen controller 812. The PCD 800 may further include a video decoder 816 coupled to the CPU 804. A video amplifier 818 may be coupled to the video decoder 816 and the touchscreen display 814. A video port 820 may be coupled to the video amplifier 818. A universal serial bus ("USB") controller 822 may also be coupled to CPU 804, and a USB port 824 may be coupled to the USB controller 822. A subscriber identity module ("SIM") card 826 may also be coupled to the CPU 804.

One or more memories may be coupled to the CPU 804. The one or more memories may include both volatile and non-volatile memories. Examples of volatile memories include static random access memory ("SRAM") 828 and DRAM 830 and 831. Such memories may be external to the SoC 802, such as the DRAM 830, or internal to the SoC 802, such as the DRAM 831. A DRAM controller 832 coupled to the CPU 804 may control the writing of data to, and reading of data from, the DRAMs 830 and 831. The DRAM controller 832 may be an example of the above-described DRAM controller 118 (FIG. 1) or 700 (FIG. 7).

A stereo audio CODEC 834 may be coupled to the analog signal processor 808. Further, an audio amplifier 836 may be coupled to the stereo audio CODEC 834. First and second stereo speakers 838 and 840, respectively, may be coupled to the audio amplifier 836. In addition, a microphone amplifier 842 may be coupled to the stereo audio CODEC 834, and a microphone 844 may be coupled to the microphone amplifier 842. A frequency modulation ("FM") radio tuner 846 may be coupled to the stereo audio CODEC 834. An FM antenna 848 may be coupled to the FM radio tuner 846. Further, stereo headphones 850 may be coupled to the stereo audio CODEC 834. Other devices that may be coupled to the CPU 804 include one or more digital (e.g., CCD or CMOS) cameras 852.

A modem or RF transceiver 854 may be coupled to the analog signal processor 808 and the CPU 804. An RF switch 856 may be coupled to the RF transceiver 854 and an RF antenna 858. In addition, a keypad 860, a mono headset with a microphone 862, and a vibrator device 864 may be coupled to the analog signal processor 808.

The SoC 802 may have one or more internal or on-chip thermal sensors 870A and may be coupled to one or more external or off-chip thermal sensors 870B. An analog-to-digital converter ("ADC") controller 872 may convert voltage drops produced by the thermal sensors 870A and 870B to digital signals. A power supply 874 and a PMIC 876 may supply power to the SoC 802.

The PCD 800 is only one example of a device or system in which exemplary embodiments of systems, methods, computer-readable media, and other embodiments of accessing data in a DRAM may be provided. Other examples may include other types of computing devices or computing systems, such as those used in datacenter, automotive, and other contexts.

Firmware or software may be stored in any of the above-described memories, such as DRAM 830 or 831, SRAM 828, etc., or may be stored in a local memory directly accessible by the processor hardware on which the software or firmware executes. Execution of such firmware or software may control aspects of any of the above-described methods or configure aspects of any of the above-described systems. Any such memory or other non-transitory storage medium having firmware or software stored therein in computer-readable form for execution by processor hardware may be an example of a "computer-readable medium," as the term is understood in the patent lexicon.

In FIG. 9, a table 900 illustrates that a memory controller may employ different memory access schemes based on client device type. For example, a memory controller may employ a broadcast memory access scheme shown in the first column of the table 900 in response to read requests received from latency-sensitive clients, and may employ a non-broadcast memory access scheme shown in the second column of the table 900 in response to read requests received from bandwidth-sensitive clients. Examples of latency-sensitive clients may include a CPU, a modem, or similar clients. Examples of memory bandwidth-sensitive clients may include a GPU, an NPU, or similar clients.

As indicated in the first column of the table 900, when a broadcast memory access scheme is employed, the memory controller may access the DRAM in a manner as though the DRAM were organized in the form of eight bank groups of two banks each. The latency for accessing 32 bytes of data using a broadcast memory access scheme is RL+4nCK. The latency for accessing 64 bytes of data using a broadcast memory access scheme (i.e., with BL=16) is also RL+4nCK. The latency for accessing 128 bytes of data using a broadcast memory access scheme (with BL=32) is RL+12nCK.

As indicated in the second column of the table 900, when a non-broadcast memory access scheme is employed, the memory controller may access the DRAM in a manner as though the DRAM were organized in the form of 16 bank groups of two banks each, even though the DRAM may be physically organized as described above with regard to FIG. 1 (i.e., two storage array groups, each organized in the form of eight bank groups of two banks each). The latency for accessing 32 bytes of data using a non-broadcast access scheme is RL+4nCK. The latency for accessing 64 bytes of data using a non-broadcast memory access scheme is RL+12nCK. The latency for accessing 128 bytes of data using a non-broadcast memory access scheme is either RL+16nCK if performed as two successive reads (with BL=32) in different bank groups, or RL+28nCK if performed as two successive reads (with BL=32) in the same bank group.

Alternative embodiments will become apparent to one of ordinary skill in the art to which the invention pertains. Therefore, although selected aspects have been illustrated and described in detail, it will be understood that various substitutions and alterations may be made therein.

Implementation examples are described in the following numbered clauses:

1. A method for accessing data in a dynamic random access memory (DRAM), comprising:

providing to the DRAM, by a memory controller, a command having a selectable pseudo-channel broadcast mode indication, the command associated with requested data;

concurrently accessing, by the memory controller, a first portion of the requested data in the DRAM via a first pseudo-channel and a second portion of the requested data in the DRAM via a second pseudo-channel in response to the command when a state of the pseudo-channel broadcast mode indication indicates a broadcast mode; and accessing, by the memory controller, the requested data in the DRAM via a selected one of the first and second pseudo-channels in response to the command when the state of the pseudo-channel broadcast mode indication indicates a non-broadcast mode.

2. The method of claim 1, wherein the DRAM is low-power double data-rate (LPDDR).

3. The method of claim 1, wherein:

the command has a pseudo-channel selection indication;

the first pseudo-channel is selected in response to the command when the state of the pseudo-channel broadcast mode indication indicates the non-broadcast mode and a state of the pseudo-channel selection indication indicates the first pseudo-channel; and the second pseudo-channel is selected in response to the command when the state of the pseudo-channel broadcast mode indication indicates the non-broadcast mode and the state of the pseudo-channel selection indication indicates the second pseudo-channel.

4. The method of claim 1, wherein providing the command comprises:

receiving a memory access request from a client device;

determining whether the memory access request is associated with the broadcast mode;

setting the state of the pseudo-channel broadcast mode indication to indicate the broadcast mode when the memory access request is associated with the broadcast mode; and setting the state of the pseudo-channel broadcast mode indication to indicate the non-broadcast mode when the memory access request is not associated with the broadcast mode.

5. The method of claim 4, wherein whether the memory access request is associated with the broadcast mode is determined based on at least one of: a target address included in the memory access request; a flag included in the memory access request; and a priority associated with the memory access request.

6. The method of claim 1, wherein providing the command comprises providing the command to the DRAM via a command bus common to the first pseudo-channel and the second pseudo-channel.

7. The method of claim 6, wherein concurrently accessing the first portion of the requested data via the first pseudo-channel and the second portion of the requested data via the second pseudo-channel comprises accessing the first portion of the requested data from a first storage array group via a first portion of a data bus and accessing the second portion of the requested data in a second storage array group via a second portion of the data bus, each of the first storage array group and the second storage array group comprising a plurality of bank groups, each bank group comprising a plurality of banks.

8. The method of claim 7, wherein the plurality of bank groups consists of eight bank groups, and the plurality of banks consists of two banks.

9. The method of claim 1, further comprising returning the requested data to a requesting host device along with information identifying the command.

10. A system for accessing data in a dynamic random access memory (DRAM), comprising:

a physical interface coupled to the DRAM; and a memory controller configured to:

provide a command having a selectable pseudo-channel broadcast mode indication to the DRAM, the command associated with requested data;

concurrently access a first portion of the requested data in the DRAM via a first pseudo-channel and a second portion of the requested data in the DRAM via a second pseudo-channel in response to the command when a state of the pseudo-channel broadcast mode indication indicates a broadcast mode; and access the requested data in the DRAM via a selected one of the first and second pseudo-channels in response to the command when the state of the pseudo-channel broadcast mode indication indicates a non-broadcast mode.

11. The system of claim 10, wherein the memory controller is included in a system-on-a-chip (SoC) and configured to receive a memory access request from a requesting host device of a plurality of host devices on the SoC.

12. The system of claim 10, wherein:

the command has a pseudo-channel selection indication;

the first pseudo-channel is selected in response to the command when the state of the pseudo-channel broadcast mode indication indicates the non-broadcast mode and a state of the pseudo-channel selection indication indicates the first pseudo-channel; and the second pseudo-channel is selected in response to the command when the state of the pseudo-channel broadcast mode indication indicates the non-broadcast mode and the state of the pseudo-channel selection indication indicates the second pseudo-channel.

13. The system of claim 10, wherein the memory controller is configured to provide the command by being configured to:

receive a memory access request from a client device, the memory access request having a target address;

determine whether the memory access request is associated with the broadcast mode;

set the state of the pseudo-channel broadcast mode indication to indicate the broadcast mode when the memory access request is associated with the broadcast mode; and set the state of the pseudo-channel broadcast mode indication to indicate the non-broadcast mode when the memory access request is not associated with the broadcast mode.

14. The system of claim 10, wherein whether the memory access request is associated with the broadcast mode is determined based on at least one of: a target address included in the memory access request; a flag included in the memory access request; and a priority associated with the memory access request.

15. The system of claim 10, wherein the memory controller is configured to provide the command by being configured to provide the command to the DRAM via a command bus common to the first pseudo-channel and the second pseudo-channel.

16. The system of claim 15, wherein the memory controller is configured to concurrently access the first portion of the requested data via the first pseudo-channel and the second portion of the requested data via the second pseudo-channel by being configured to access the first portion of the requested data in a first storage array group via a first portion of a data bus and accessing the second portion of the requested data in a second storage array group via a second portion of the data bus, each of the first storage array group and the second storage array group comprising a plurality of bank groups, each bank group comprising a plurality of banks.

17. The system of claim 16, wherein the plurality of bank groups consists of eight bank groups, and the plurality of banks consists of two banks.

18. The system of claim 10, wherein the memory controller is further configured to return the requested data to a requesting host device along with information identifying the command.

19. A system for accessing data in a dynamic random access memory (DRAM), comprising:

means for providing a command having a selectable pseudo-channel broadcast mode indication to the DRAM, the command associated with requested data;

means for concurrently accessing a first portion of the requested data in the DRAM via a first pseudo-channel and a second portion of the requested data in the DRAM via a second pseudo-channel in response to the command when a state of the pseudo-channel broadcast mode indication indicates a broadcast mode; and means for accessing the requested data in the DRAM via a selected one of the first and second pseudo-channels in response to the command when the state of the pseudo-channel broadcast mode indication indicates a non-broadcast mode.

20. The system of claim 19, wherein the means for providing, means for concurrently accessing, and means for accessing are included in a system-on-a-chip (SoC), and wherein the system further comprises means for receiving a memory access request from a requesting host device of a plurality of host devices on the SoC.

21. The system of claim 19, wherein:
the command has a pseudo-channel selection indication;
the first pseudo-channel is selected in response to the command when the state of the pseudo-channel broadcast mode indication indicates the non-broadcast mode and a state of the pseudo-channel selection indication indicates the first pseudo-channel; and
the second pseudo-channel is selected in response to the command when the state of the pseudo-channel broadcast mode indication indicates the non-broadcast mode and the state of the pseudo-channel selection indication indicates the second pseudo-channel.

22. The system of claim 19, wherein the means for providing the command comprises means for providing the command to the DRAM via a command bus common to the first pseudo-channel and the second pseudo-channel.

23. The system of claim 22, wherein the means for concurrently accessing the first portion of the requested data via the first pseudo-channel and the second portion of the requested data via the second pseudo-channel comprises means for accessing the first portion of the requested data in a first storage array group via a first portion of a data bus and for accessing the second portion of the requested data in a second storage array group via a second portion of the data bus, each of the first storage array group and the second storage array group comprising a plurality of bank groups, each bank group comprising a plurality of banks.

24. The system of claim 23, wherein the plurality of bank groups consists of eight bank groups, and the plurality of banks consists of two banks.

25. The system of claim 19, further comprising means for returning the requested data to a requesting host device along with information identifying the command.

26. A dynamic random access memory (DRAM), comprising:
a plurality of DRAM storage arrays; and
a DRAM command interface configured to:
receive a command having a selectable pseudo-channel broadcast mode indication, the command associated with requested data;
concurrently access a first portion of the requested data in the DRAM storage arrays via a first pseudo-channel and a second portion of the requested data in the DRAM storage arrays via a second pseudo-channel in response to the command when a state of the pseudo-channel broadcast mode indication indicates a broadcast mode; and
access the requested data in the DRAM storage arrays via a selected one of the first and second pseudo-channels in response to the command when the state of the pseudo-channel broadcast mode indication indicates a non-broadcast mode.

27. The DRAM of claim 26, wherein:
the command has a pseudo-channel selection indication;
the first pseudo-channel is selected in response to the command when the state of the pseudo-channel broadcast mode indication indicates the non-broadcast mode and a state of the pseudo-channel selection indication indicates the first pseudo-channel; and
the second pseudo-channel is selected in response to the command when the state of the pseudo-channel broadcast mode indication indicates the non-broadcast mode and the state of the pseudo-channel selection indication indicates the second pseudo-channel.

28. The DRAM of claim 26, wherein the DRAM command interface is common to the first pseudo-channel and the second pseudo-channel.

29. The DRAM of claim 26, wherein the DRAM command interface is configured to concurrently access the first portion of the requested data via the first pseudo-channel and the second portion of the requested data via the second pseudo-channel by being configured to access the first portion of the requested data in a first storage array group via a first portion of a data bus and accessing the second portion of the requested data in a second storage array group via a second portion of the data bus, each of the first storage array group and the second storage array group comprising a plurality of bank groups, each bank group comprising a plurality of banks.

30. The DRAM of claim 29, wherein the plurality of bank groups consists of eight bank groups, and the plurality of banks consists of two banks.

What is claimed is:

1. A method for accessing data in a dynamic random access memory (DRAM), comprising:
providing to the DRAM, by a memory controller, a command having a selectable pseudo-channel broadcast mode indication, the command associated with requested data;
concurrently accessing, by the memory controller, a first portion of the requested data in the DRAM via a first pseudo-channel and a second portion of the requested data in the DRAM via a second pseudo-channel in response to the command when a state of the pseudo-channel broadcast mode indication indicates a broadcast mode; and
accessing, by the memory controller, the requested data in the DRAM via a selected one of the first and second pseudo-channels in response to the command when the state of the pseudo-channel broadcast mode indication indicates a non-broadcast mode.

2. The method of claim 1, wherein the DRAM is low-power double data-rate (LPDDR).

3. The method of claim 1, wherein:
the command has a pseudo-channel selection indication;
the first pseudo-channel is selected in response to the command when the state of the pseudo-channel broadcast mode indication indicates the non-broadcast mode and a state of the pseudo-channel selection indication indicates the first pseudo-channel; and
the second pseudo-channel is selected in response to the command when the state of the pseudo-channel broadcast mode indication indicates the non-broadcast mode and the state of the pseudo-channel selection indication indicates the second pseudo-channel.

4. The method of claim 1, wherein providing the command comprises:
receiving a memory access request from a client device;
determining whether the memory access request is associated with the broadcast mode;
setting the state of the pseudo-channel broadcast mode indication to indicate the broadcast mode when the memory access request is associated with the broadcast mode; and
setting the state of the pseudo-channel broadcast mode indication to indicate the non-broadcast mode when the memory access request is not associated with the broadcast mode.

5. The method of claim 4, wherein whether the memory access request is associated with the broadcast mode is determined based on at least one of: a target address included in the memory access request; a flag included in the memory access request; and a priority associated with the memory access request.

6. The method of claim 1, wherein providing the command comprises providing the command to the DRAM via a command bus common to the first pseudo-channel and the second pseudo-channel.

7. The method of claim 6, wherein concurrently accessing the first portion of the requested data via the first pseudo-channel and the second portion of the requested data via the second pseudo-channel comprises accessing the first portion of the requested data from a first storage array group via a first portion of a data bus and accessing the second portion of the requested data in a second storage array group via a second portion of the data bus, each of the first storage array group and the second storage array group comprising a plurality of bank groups, each bank group comprising a plurality of banks.

8. The method of claim 7, wherein the plurality of bank groups consists of eight bank groups, and the plurality of banks consists of two banks.

9. The method of claim 1, further comprising returning the requested data to a requesting host device along with information identifying the command.

10. A system for accessing data in a dynamic random access memory (DRAM), comprising:
a physical interface coupled to the DRAM; and
a memory controller configured to:
provide a command having a selectable pseudo-channel broadcast mode indication to the DRAM, the command associated with requested data;
concurrently access a first portion of the requested data in the DRAM via a first pseudo-channel and a second portion of the requested data in the DRAM via a second pseudo-channel in response to the command when a state of the pseudo-channel broadcast mode indication indicates a broadcast mode; and
access the requested data in the DRAM via a selected one of the first and second pseudo-channels in response to the command when the state of the pseudo-channel broadcast mode indication indicates a non-broadcast mode.

11. The system of claim 10, wherein the memory controller is included in a system-on-a-chip (SoC) and configured to receive a memory access request from a requesting host device of a plurality of host devices on the SoC.

12. The system of claim 10, wherein:
the command has a pseudo-channel selection indication;
the first pseudo-channel is selected in response to the command when the state of the pseudo-channel broadcast mode indication indicates the non-broadcast mode and a state of the pseudo-channel selection indication indicates the first pseudo-channel; and
the second pseudo-channel is selected in response to the command when the state of the pseudo-channel broadcast mode indication indicates the non-broadcast mode and the state of the pseudo-channel selection indication indicates the second pseudo-channel.

13. The system of claim 10, wherein the memory controller is configured to provide the command by being configured to:
receive a memory access request from a client device, the memory access request having a target address;
determine whether the memory access request is associated with the broadcast mode;
set the state of the pseudo-channel broadcast mode indication to indicate the broadcast mode when the memory access request is associated with the broadcast mode; and
set the state of the pseudo-channel broadcast mode indication to indicate the non-broadcast mode when the memory access request is not associated with the broadcast mode.

14. The system of claim 10, wherein whether the memory access request is associated with the broadcast mode is determined based on at least one of: a target address included in the memory access request; a flag included in the memory access request; and a priority associated with the memory access request.

15. The system of claim 10, wherein the memory controller is configured to provide the command by being configured to provide the command to the DRAM via a command bus common to the first pseudo-channel and the second pseudo-channel.

16. The system of claim 15, wherein the memory controller is configured to concurrently access the first portion of the requested data via the first pseudo-channel and the second portion of the requested data via the second pseudo-channel by being configured to access the first portion of the requested data in a first storage array group via a first portion of a data bus and accessing the second portion of the requested data in a second storage array group via a second portion of the data bus, each of the first storage array group and the second storage array group comprising a plurality of bank groups, each bank group comprising a plurality of banks.

17. The system of claim 16, wherein the plurality of bank groups consists of eight bank groups, and the plurality of banks consists of two banks.

18. The system of claim 10, wherein the memory controller is further configured to return the requested data to a requesting host device along with information identifying the command.

19. A system for accessing data in a dynamic random access memory (DRAM), comprising:
means for providing a command having a selectable pseudo-channel broadcast mode indication to the DRAM, the command associated with requested data;
means for concurrently accessing a first portion of the requested data in the DRAM via a first pseudo-channel and a second portion of the requested data in the DRAM via a second pseudo-channel in response to the command when a state of the pseudo-channel broadcast mode indication indicates a broadcast mode; and
means for accessing the requested data in the DRAM via a selected one of the first and second pseudo-channels in response to the command when the state of the pseudo-channel broadcast mode indication indicates a non-broadcast mode.

20. The system of claim 19, wherein the means for providing, means for concurrently accessing, and means for accessing are included in a system-on-a-chip (SoC), and wherein the system further comprises means for receiving a memory access request from a requesting host device of a plurality of host devices on the SoC.

21. The system of claim 19, wherein:
the command has a pseudo-channel selection indication;
the first pseudo-channel is selected in response to the command when the state of the pseudo-channel broadcast mode indication indicates the non-broadcast mode and a state of the pseudo-channel selection indication indicates the first pseudo-channel; and
the second pseudo-channel is selected in response to the command when the state of the pseudo-channel broadcast mode indication indicates the non-broadcast mode and the state of the pseudo-channel selection indication indicates the second pseudo-channel.

22. The system of claim 19, wherein the means for providing the command comprises means for providing the command to the DRAM via a command bus common to the first pseudo-channel and the second pseudo-channel.

23. The system of claim 22, wherein the means for concurrently accessing the first portion of the requested data via the first pseudo-channel and the second portion of the requested data via the second pseudo-channel comprises means for accessing the first portion of the requested data in a first storage array group via a first portion of a data bus and for accessing the second portion of the requested data in a second storage array group via a second portion of the data bus, each of the first storage array group and the second storage array group comprising a plurality of bank groups, each bank group comprising a plurality of banks.

24. The system of claim 23, wherein the plurality of bank groups consists of eight bank groups, and the plurality of banks consists of two banks.

25. The system of claim 19, further comprising means for returning the requested data to a requesting host device along with information identifying the command.

26. A dynamic random access memory (DRAM), comprising:
a plurality of DRAM storage arrays; and
a DRAM command interface configured to:
receive a command having a selectable pseudo-channel broadcast mode indication, the command associated with requested data;
concurrently access a first portion of the requested data in the DRAM storage arrays via a first pseudo-channel and a second portion of the requested data in the DRAM storage arrays via a second pseudo-channel in response to the command when a state of the pseudo-channel broadcast mode indication indicates a broadcast mode; and
access the requested data in the DRAM storage arrays via a selected one of the first and second pseudo-channels in response to the command when the state of the pseudo-channel broadcast mode indication indicates a non-broadcast mode.

27. The DRAM of claim 26, wherein:
the command has a pseudo-channel selection indication;
the first pseudo-channel is selected in response to the command when the state of the pseudo-channel broadcast mode indication indicates the non-broadcast mode and a state of the pseudo-channel selection indication indicates the first pseudo-channel; and
the second pseudo-channel is selected in response to the command when the state of the pseudo-channel broadcast mode indication indicates the non-broadcast mode and the state of the pseudo-channel selection indication indicates the second pseudo-channel.

28. The DRAM of claim 26, wherein the DRAM command interface is common to the first pseudo-channel and the second pseudo-channel.

29. The DRAM of claim 26, wherein the DRAM command interface is configured to concurrently access the first portion of the requested data via the first pseudo-channel and the second portion of the requested data via the second pseudo-channel by being configured to access the first portion of the requested data in a first storage array group via a first portion of a data bus and accessing the second portion of the requested data in a second storage array group via a second portion of the data bus, each of the first storage array group and the second storage array group comprising a plurality of bank groups, each bank group comprising a plurality of banks.

30. The DRAM of claim 29, wherein the plurality of bank groups consists of eight bank groups, and the plurality of banks consists of two banks.

\* \* \* \* \*